United States Patent [19]

Flanders

[11] 3,940,008

[45] Feb. 24, 1976

[54] COLLAPSIBLE REUSABLE BARREL FOR FLUIDS

[76] Inventor: Robert D. Flanders, 18040 Lower Boones Ferry Road, Tigard, Oreg. 97223

[22] Filed: May 22, 1972

[21] Appl. No.: 255,597

[52] U.S. Cl................ 220/5 R; 220/319; 220/326; 285/364; 285/368; 292/256.6; 292/256.67
[51] Int. Cl.²..................... B65D 7/02; B65D 45/16
[58] Field of Search............ 220/5 R, 4 E, 4 B, 5 A, 220/55 AN, 80, 5, 319, 326; 292/256.63, 256.65, 256.67, 256.69, 256.6; 285/364, 365, 366, 367, 368, 406, 407, 408, 409, 410, 411, 412; 138/97, 99

[56] References Cited
UNITED STATES PATENTS

| | | | |
|---|---|---|---|
| 295,295 | 3/1884 | Sinclair | 285/364 |
| 1,390,784 | 9/1921 | Herrington | 220/4 E |
| 1,689,085 | 10/1928 | Russell et al. | 220/55 AN |
| 2,065,480 | 12/1936 | Soper | 285/364 |
| 3,044,657 | 7/1962 | Horton | 220/5 R |
| 3,143,238 | 8/1964 | Bulgrin | 220/5 R |
| 3,244,311 | 4/1966 | Lawson | 220/4 B |
| 3,283,348 | 11/1966 | Farmer et al. | 220/5 A |
| 3,359,018 | 12/1967 | Simons | 285/367 |
| 3,455,336 | 7/1969 | Ellis | 138/99 |

FOREIGN PATENTS OR APPLICATIONS 1,152,226  2/1958  France ............... 220/5 A Primary Examiner—Donald F. Norton
Assistant Examiner—Allan N. Shoap
Attorney, Agent, or Firm—Chernoff & Vilhauer

[57] ABSTRACT

A metal reusable barrel for storing and shipping fluids. The barrel is capable of being disassembled after initial use to minimize the space required for transporting the barrel back to the original shipper and also minimize the expense of reconditioning the barrel for reuse. The barrel comprises two barrel halves, each in the shape of a frustum with the larger end open and the smaller end sealingly closed by a circular plate. The open ends of the two barrel halves are sealingly clamped together to form a fully assembled, leakproof barrel. When the barrel is empty it may be disassembled by detaching the two barrel halves from one another and nesting one inside the other for shipment back to the producer. In their disassembled condition the barrel halves can be easily cleaned and reconditioned because of the accessibility of their interior surfaces, after which they may be reassembled and reused.

2 Claims, 8 Drawing Figures

COLLAPSIBLE REUSABLE BARREL FOR FLUIDS

BACKGROUND OF THE INVENTION

This invention relates to improvements in rigid barrels of the type generally constructed of metal and used for the shipment and storage of a great variety of commercial and industrial liquids such as fuels, lubricants and solvents. Metal barrels of the type known to the art cannot be disassembled, collapsed or reduced in size in any way in order to economically return them to the original shipper for reuse. Inasmuch as an empty barrel occupies the same cubic space as a full one, the cost of shipping the barrels back for recycling is prohibitive, representing a substantial part of the value of the barrel itself. In addition, all metal barrels must be cleaned, derusted, degreased and repainted before they can be used again. Barrel cleaning is most often accomplished through one bung hole in the barrel head, and because of the inaccessibility of the interior of the barrel, it is a costly and time consuming process. Thus, when the shipping charges are added to the reconditioning costs, the cost of a recycled barrel is almost the same as that of a new barrel. Since the cost of the barrel is most often absorbed by the user, this means that he must pay nearly the full cost of a new barrel every time he uses one, regardless of whether or not he goes to the effort of recycling his old barrels. Obviously, there is very little economic incentive for him to expend this effort.

SUMMARY OF THE PRESENT INVENTION

The present invention is directed to a rigid barrel for storing and shipping fluids of the general type described wherein the barrel is comprised of two detachable half sections, each in the shape of a frustum having its larger end open and its smaller end closed. To assemble the barrel, the two open ends of the barrel halves are sealingly attached to one another at their peripheries to form a leak-proof seal around the middle girth of the barrel. One or both of the closed ends of the barrel halves contain a suitable bung hole for filling and emptying the barrel. To disassemble the barrel, the barrel halves are detached from one another and nested one inside the other to conserve space.

The feature of a barrel comprised of two detachable, nestable half sections provides a number of significant advantages not obtainable with conventional fluid barrels known to the art. First, the fact that the barrel may be disassembled into nestable components insures that the user can ship a minimum of five such barrels in their disassembled condition in the same cubic space required for one assembled barrel. This fact in itself drastically reduces the cost of transporting the barrels back to the original producer or shipper for recycling. In addition, the entire inner surfaces of the disassembled barrel components are easily accessible so that, for the first time, automated mechanical cleaning mechanisms may be used to clean the interior of the barrels prior to their reuse. This feature permits a reduction of from 50 to 75% in the cost of cleaning each barrel. When the cost savings in connection with both transportation and cleaning are added together, it is expected that the cost of reusing metal barrels incorporating the features of the present invention will be as much as 75 to 80% lower than the cost of reusing conventional metal barrels.

An additional advantage of the present invention is that a substantial final market is available for the barrel halves after they have outlived their usefulness as fluid containers, whereas the final market for conventional barrels is extremely limited. The half sections of the barrels of the present invention will find widespread demand as tree containers for nurseries and as warehouse storage containers for mechanical parts, components, and almost anything that will fit within the confines of the barrel sections.

It is therefore a primary objective of the present invention to provide a new and improved metal barrel for shipping and storing commercial and industrial fluids capable of being disassembled to permit economical transporting and cleaning of the barrel after initial use, so that it may be recycled at a cost much less than the cost of a new barrel.

It is a further objective of the present invention to provide a metal barrel suitable for use as an open container for a wide variety of materials after it has outlived its usefulness as a fluid container.

It is a primary feature of the present invention to provide a metal barrel comprised of multiple sections detachably joined with one another to form a fully assembled barrel and nestable one inside the other when the barrel is disassembled.

The foregoing and other objectives, features, and advantages of the present invention will be more readily understood upon consideration of the following detailed description of the invention taken in conjunction with the accompanying drawings.

DESCRIPTION OF THE PREFERRED EMBODIMENT

Figure 8:
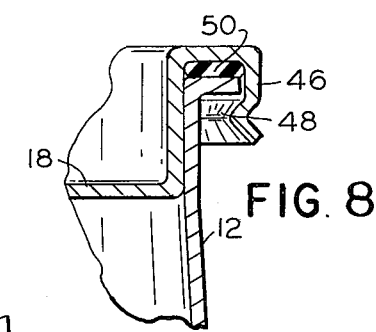
FIG. 8 is a cross-sectional view of an optional leak-proof joint for securing the circular cover plates to the closed ends of the respective barrel halves.
Figure 1:
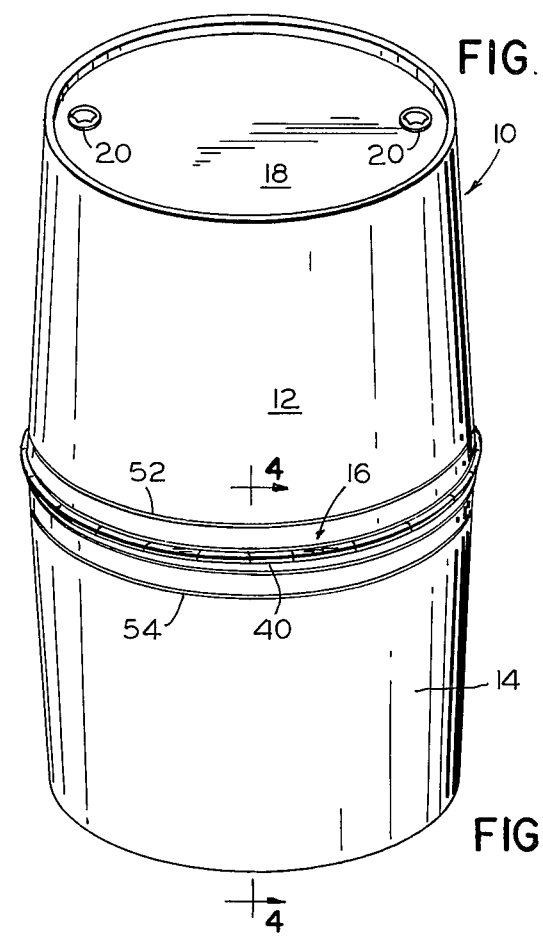
FIG. 1 is a top perspective view of the collapsible reusable fluid barrel in its fully assembled condition with the two barrel halves sealingly joined together at the middle of the barrel.

The collapsible reusable barrel of the present invention, designated generally as 10 in FIG. 1, comprises two half barrel sections 12 and 14 respectively, each in the shape of a frustum. The larger ends of the two sections are open and, when the barrel is fully assembled as shown in FIG. 1, are detachably joined with one another by means of a leak-proof mating seam 16. The smaller ends of the two frustums are sealingly covered with circular plates 18 and 19 respectively, each having one or more capped bung holes 20 for filling and emptying the barrel.

Figures 4, 5, 7:
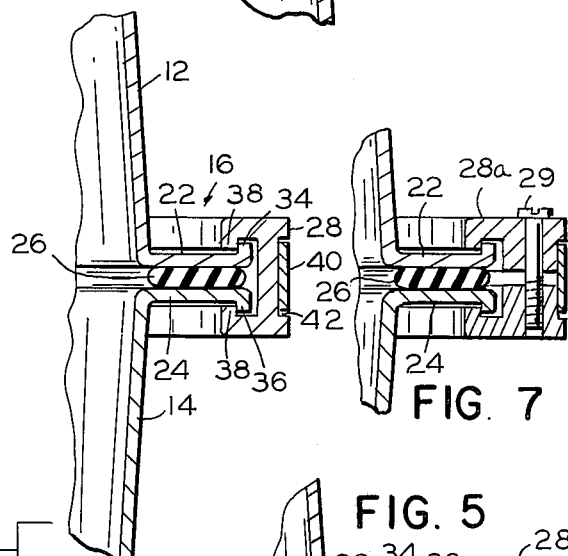
FIG. 4 is a partial broken cross sectional view of the fully assembled barrel taken along line 4—4 of FIG. 1.
FIG. 5 is a cross sectional view of the leak-proof seam around the middle girth of the barrel illustrated prior to its being secured together by a clamp.
FIG. 7 is a cross-sectional view of the seam held together by an optional screw-type attaching clamp.
Figures 3, 6:
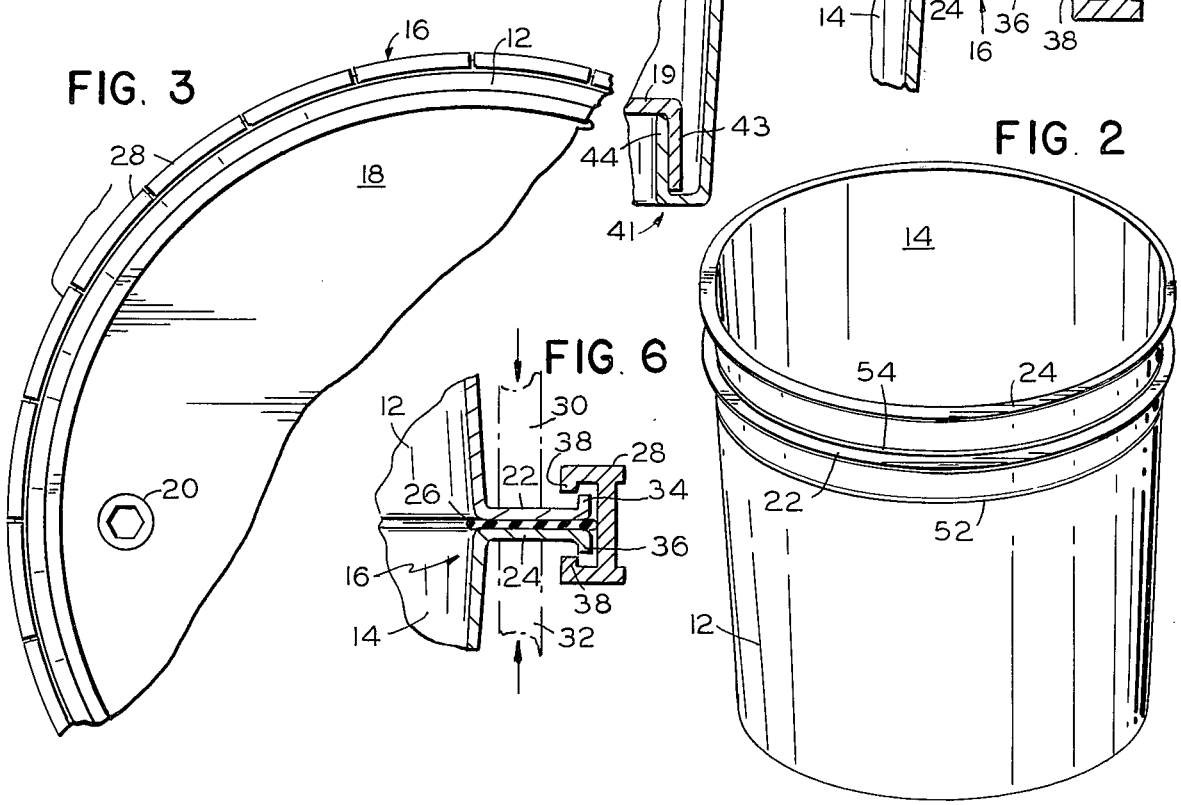
FIG. 3 is a partial top view of the fully assembled barrel.
FIG. 6 is a cross sectional view of the seam illustrated in its extreme compressed condition for permitting the installation of the attaching clamps.

As shown more clearly in FIGS. 4–6, the open end of each barrel section is provided with an outwardly projecting peripheral flange, 22 and 24 respectively, extending continuously around the perimeter of each such open end. The two barrel sections are designed such that their larger open ends are of precisely the same diameter, so that the flanges 22 and 24 may be aligned in opposing relation to one another when the two open ends are joined together.

To assemble the barrel, the open ends of the two barrel sections 12 and 14 are aligned as shown in FIG. 5, and a resilient gasket 26, preferably an o-ring, is placed between the two opposing flanges 22 and 24 respectively. The two ends of the barrel sections are then forced tightly together, as illustrated in FIG. 6, by means of a suitable press device (not shown) which applies pressure through press members 30 and 32 against flanges 22 and 24 respectively. The forcing of the two barrel halves together tightly compresses the o-ring 26 and allows the placement of a group of arcuate coupling clamp members 28 over the peripheral lips 34 and 36 of the two flanges 22 and 24 respectively. Preferably, the clamps 28 are closely spaced around the seam 16 as illustrated in FIG. 3 to insure that the seam 16 will be leak-proof.

Once the clamps 28 are in position, with their inner tips 38 inside the lips 34 and 36 of the flanges 22 and 24 respectively, the pressure holding the two barrel sections together is released. The compressed o-ring 26 forces the barrel halves apart until the inner tips 38 of the clamp members 28 are locked inside the lips 34 and 36 of the flanges 22 and 24 respectively as shown in FIG. 4. Thereafter, in order to insure that the clamp members 28 will not be released from the flanges 22 and 24 during the handling of the barrel, a binder strap 40 is stretched tightly around the exterior grooves 42 of the clamp members 28. In their locked position, the clamp members 28 hold the flanges 22 and 24 sufficiently close together to insure that the o-ring 26 is in a state of compression and forms a tight, leak-proof seal continuously around the seam 16.

An alternative type of attaching clamp 28a is illustrated in FIG. 7, and comprises a top and bottom portion held together by a screw 29 which is threaded into the bottom portion. Utilization of this type of clamp removes the requirement for a press to force the flanges 22 and 24 together during assembly. Rather the clamps 28a may simply be installed in their loosened condition and then the screw 29 tightened to force the flanges together, thereby compressing the o-ring 26.

The closed end of each barrel section comprises a circular plate 18 and 19 respectively, which is sealingly joined at its periphery with the wall of the barrel section. One possible structure for connecting the plate with the wall is the simple joint 41 shown in FIG. 4 where plate 19 is attached to the barrel section 14. The plate 19 has a peripheral flange 43 which fits inside a mating crimped flange 44 of the barrel section 14. The two flanges are sealingly joined by a continuous circumferential weld. An alternative structure is shown in FIG. 7 with respect to barrel section 12 and plate 18. There the plate 18 has a peripheral flange 46 which is crimped tightly over a mating flange 48 of the barrel section 12, and the joint is sealed by a resilient gasket 50 which is compressed tightly between the two flanges. Other forms of joints, or for that matter a barrel half which is entirely of one-piece construction, might also be feasible.

Figure 2:
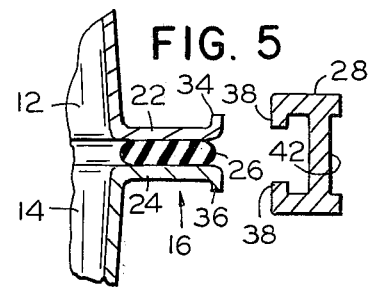
FIG. 2 is a top perspective view of the barrel in its disassembled condition, with one barrel half nested inside the other for transportation back to the original shipper.

When the contents of the barrel 10 have been used, and it is desired to transport the barrel back to the original shipper for recycling, the barrel is disassembled by reversing the steps necessary to assemble it. The band 40 is removed, the two barrel halves are pressed tightly together by a suitable press (or alternatively the clamp 28a is loosened) and the clamp members are removed. Thereafter the two barrel sections are separated and nested one inside the other as shown in FIG. 2, or inside similar sections from other barrels. A narrow protruding peripheral shoulder 52, 54 on each of the barrel sections is provided to insure that the two sections will not nest too tightly together by limiting the extent to which one section may be inserted inside the other. This insures that the sections will be easily separable for reassembly.

It is preferable that the two barrel sections be identical frustums, since this permits any section to be nested within any other section for convenience. In addition, the provision of identical barrel halves allows complete interchangeability of the sections when reassembling the barrels. It should be recognized however that frustums, while perhaps the most convenient form of nestable barrel halves, are not the only form. Accordingly, it is within the scope and intent of this invention to use other geometric configurations for the barrel sections, so long as they are nestable configurations.

In some applications, particularly when the liquids being shipped or stored are oils, chemicals, inks or consumable beverages, it may be desirable to provide a removable plastic or rubber film envelope or liner (not shown) which may be inserted inside of each barrel during assembly. The liner would preferably have a grommet or tube type opening which could be fastened to or fitted loosely within a bung hole, and would conform to the interior of the barrel when filled. Upon emptying and disassembly of the barrel, the liner could be discarded and replaced with a new one. The inclusion of such a liner would remove the need for cleaning the barrels after each use, a task particularly difficult when inks or chemicals are being handled. In addition, the use of such liners would insure sanitary handling of such beverages as milk, orange juice, wine, etc.

The terms and expressions which have been employed in the foregoing abstract and specification are used therein as terms of descriptions and not of limitation, and there is no intention, in the use of such terms and expressions, of excluding equivalents of the features shown and described or portions thereof, it being recognized that the scope of the invention is defined and limited only by the claims which follow.

What is claimed is:

1. In a barrel for storing and shipping fluids and other materials comprised of a pair of frustrum-shaped shell-like barrel sections, each having a closed end and an open end larger than said closed end and being interchangeably nestable one within the other when disassembled, said barrel sections each having mating means for sealingly and detachably joining said open ends together with the respective interiors of said two barrel sections facing one another, the improvement wherein said mating means comprises: a pair of projecting flanges each extending peripherally around the open ends of said barrel sections and having a respective pair of lips formed peripherally around the edges thereof, a resilient gasket for inserting between said flange pair, and a plurality of unitary C-shaped clamp members spaced around the periphery of said flange pair for holding said flange pair in non-contacting close proximity with said gasket compressed therebetween, said clamp members having their respective ends bend inwardly toward one another for interlocking with said respective lips formed around said flange pair and being detachable from said flange pair by the pressing of said barrel sections together momentarily to increase the compression of said resilient gasket thereby freeing said clamp members from engagement with said flange pair.

2. In a barrel for storing and shipping fluids and other materials comprised of a pair of frustrum-shaped shell-like barrel sections, each having a closed end and an open end larger than said closed end and being interchangeably nestable one within the other when disassembled, said barrel sections each having mating means for sealingly and detachably joining said open ends together with the respective interiors of said two barrel sections facing one another, the improvement wherein said mating means comprises: a pair of projecting flanges each extending peripherally around the respective open ends of said barrel sections, a resilient gasket for inserting between said flange pair, a plurality of unitary C-shaped clamp members having grooves formed on the outside bight portions thereof and being spaced around the periphery of said flange pair for holding said flange pair in non-contacting close proximity with said gasket compressed therebetween, said clamp members being detachable from said flange pair by the pressing of said barrel sections together momentarily to increase the compression of said resilient gasket thereby freeing said clamp members from engagement with said flange pair, and a binder strap extending around the periphery of said flanges and seated within said grooves for holding said clamp members onto said flanges.

* * * * *

UNITED STATES PATENT AND TRADEMARK OFFICE
CERTIFICATE OF CORRECTION

PATENT NO. : 3,940,008
DATED : February 24, 1976
INVENTOR(S) : Robert D. Flanders It is certified that error appears in the above-identified patent and that said Letters Patent are hereby corrected as shown below:

Col. 4      Line 54      Change "frustrum-shaped" to --frustum-shaped--.

Col. 5      Line 12      Change "frustrum-shaped" to --frustum-shaped--.

Signed and Sealed this

Twentieth Day of July 1976

[SEAL]

Attest:

RUTH C. MASON
*Attesting Officer*

C. MARSHALL DANN
*Commissioner of Patents and Trademarks*